July 4, 1967  F. MILLS, JR  3,329,441
WHEELED CART CONSTRUCTION
Filed Jan. 11, 1965  3 Sheets-Sheet 1
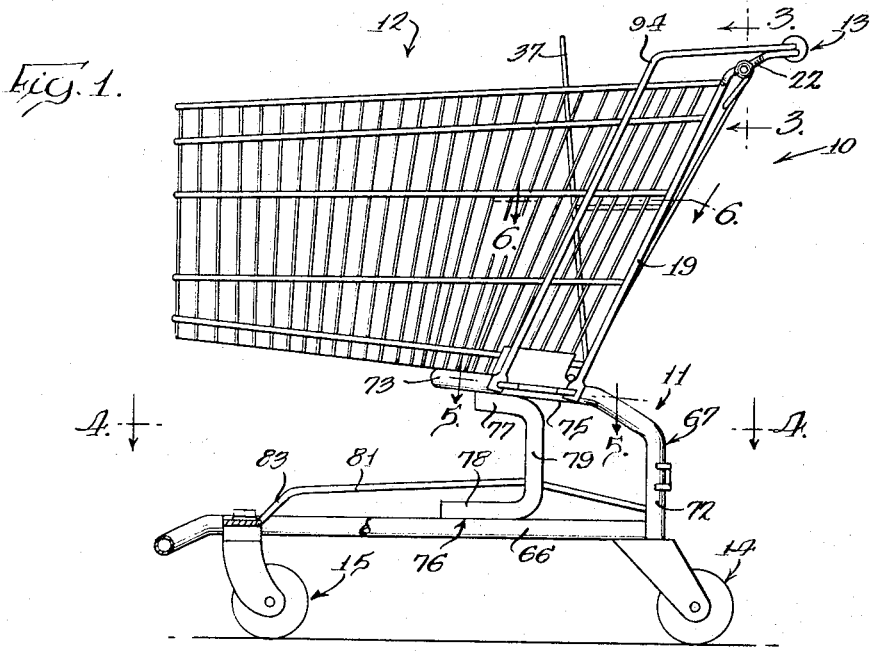
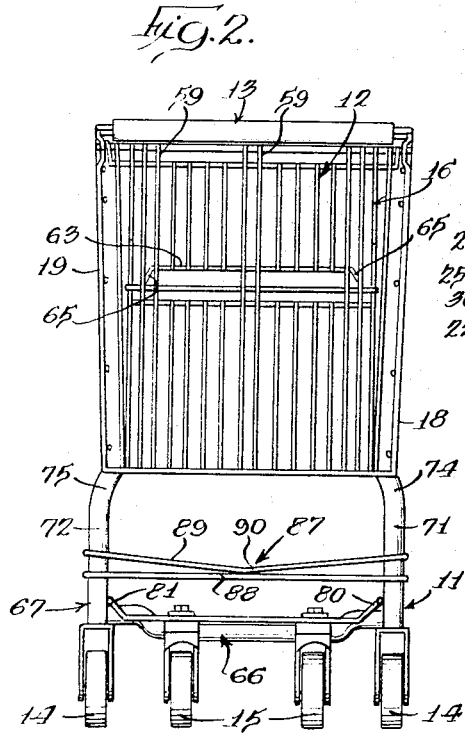
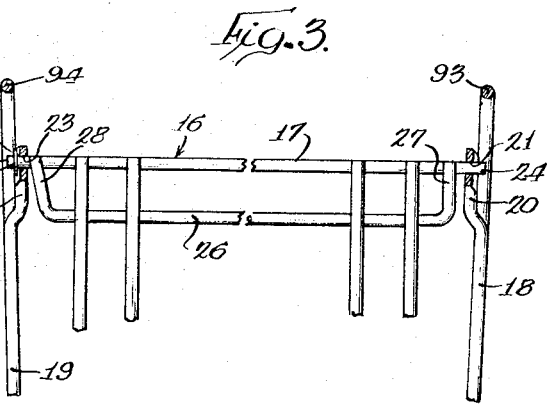
Inventor:
Frank Mills, Jr.
By
Hofgren, Wegner,
Allen, Stellman & McCord
Attys

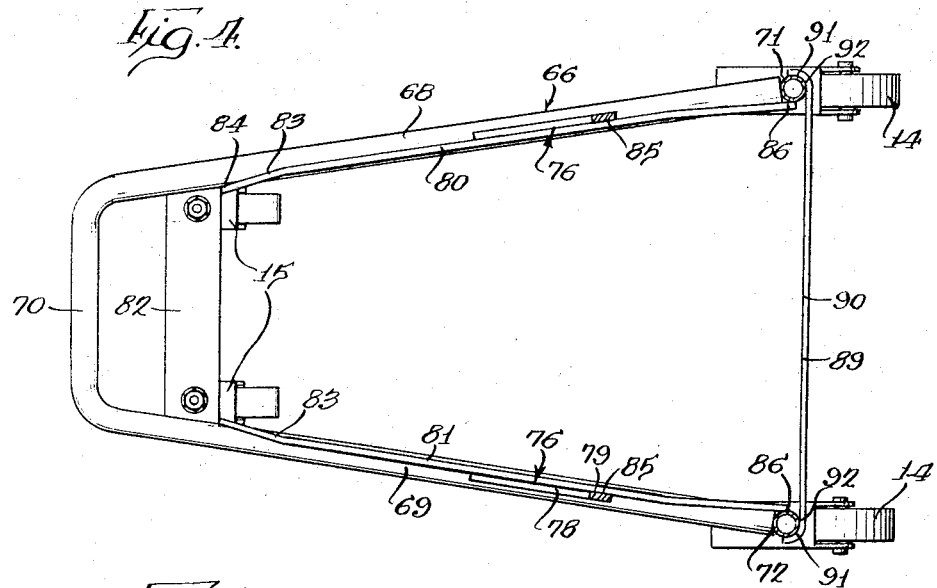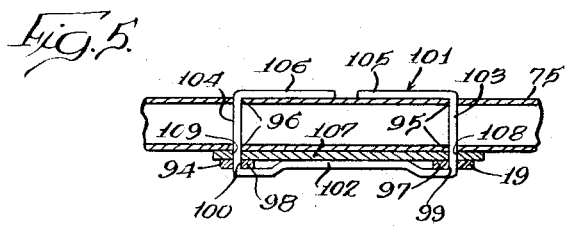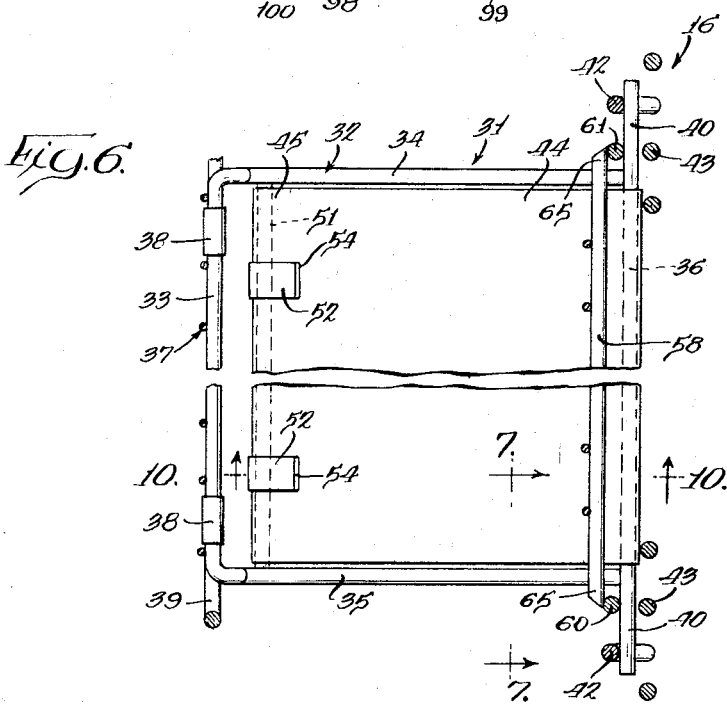

July 4, 1967  F. MILLS, JR  3,329,441
WHEELED CART CONSTRUCTION
Filed Jan. 11, 1965  3 Sheets-Sheet 3
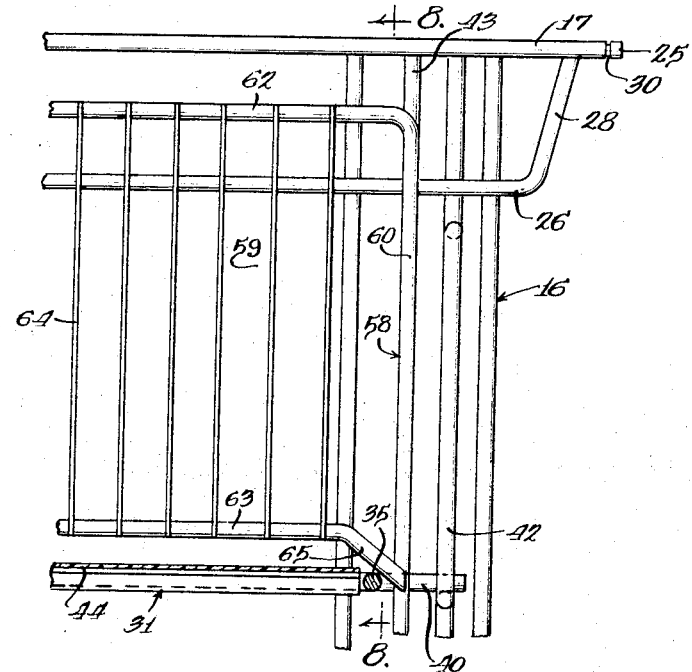
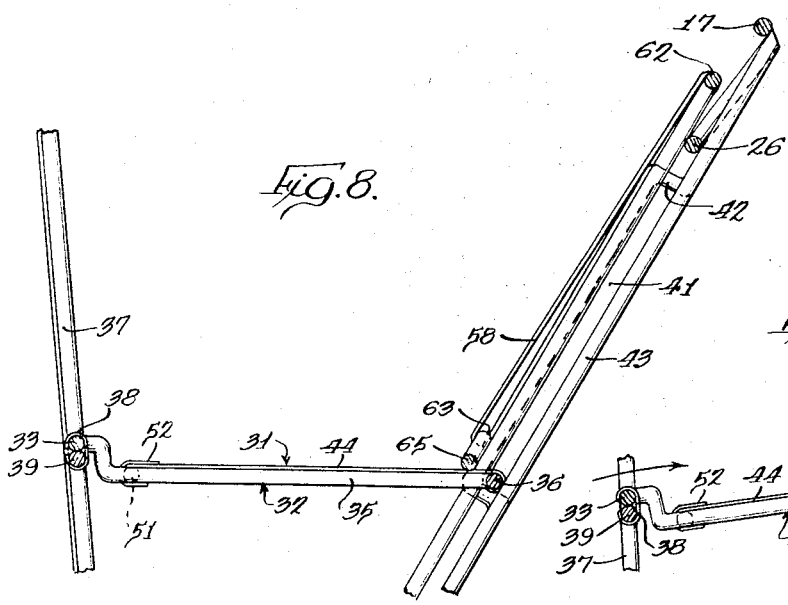
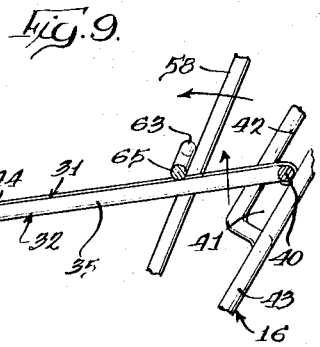
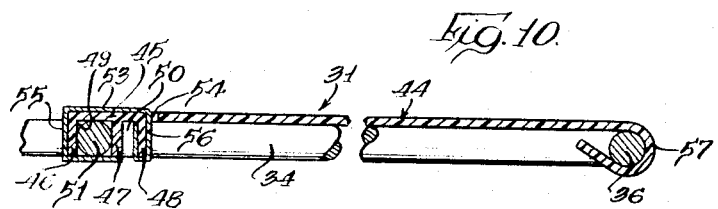

United States Patent Office 3,329,441
Patented July 4, 1967

3,329,441
WHEELED CART CONSTRUCTION
Frank Mills, Jr., Olympia Fields, Ill., assignor to Tote-Cart Company, a corporation of Illinois
Filed Jan. 11, 1965, Ser. No. 424,492
18 Claims. (Cl. 280—33.99)

This invention relates to wheeled carts and in particular to wheeled carts such as grocery shopping charts having a basket carried on a wheeled frame.

In the construction and design of wheeled cart structures such as grocery cart structures, it is desirable to provide at low cost a cart structure having maximum rigidity and strength. Such carts are severely strained in the normal use thereof as they are adapted to carry relatively heavy loads which impose severe shock forces and the like on the art structure, particularly where the cart structure is roughly handled such as for example being dropped over a curb or the like.

In one form of such cart structure a baby seat is provided at the rear of the structure with the rear gate of the basket being provided with leg openings through which the baby's legs may extend when seated on the seat member. Here again it is desirable to provide maximum strength in the seat structure at low cost.

The present invention comprehends an improved wheeled cart structure providing the desired improved strength and rigidity while yet effectively minimizing the cost thereof. Thus, a principal feature of the present invention is a new and improved wheeled cart structure.

Another feature of the invention is the provision of such a wheeled cart structure having an improved basket structure wherein the rear gate is mounted on the basket by new and improved pivot means providing high strength and rigidity at effectively minimum cost.

Another feature of the invention is the provision of such a wheeled cart having a basket structure including a pair of upright, horizontally spaced handle wires having axially aligned openings, a gate for movably defining a basket wall, the gate including a pivot rod having outwardly extending opposite ends pivotally received in the aligned openings, and a cross-bar having one end secured to one of the pivot rod ends inwardly adjacent one handle wire, and locking means on the one pivot rod end outwardly of the one handle wire, the locking means and cros-bar end being slidably engageable with the one handle wire to retain the pivot rod against axial displacement.

A further feature of the invention is the provision of such a wheeled cart having a new and improved seat structure having improved strength and rigidity at effectively minimum cost.

A further feature of the invention is the provision of such a wheeled cart wherein the seat structure includes a wire frame having a rectilinear support rod, a seat member including, outer, middle and inner depending parallel spaced ribs defining an outer channel and an inner channel, and a clip having a bight portion overlying the seat member, a first portion downturned from the bight portional to extend to below the seat member and under the outer channel, and a second portion downturned from the bight portion to extend to below the seat member and around the inner rib, the support rod being received in the forward channel and retained therein by the second portion of the clip.

Yet another feature of the invention is the provision of such a wheeled cart wherein the seat structure includes new and improved means for movably associating the leg hole closure with the seat member.

A still further feature of the invention is the provision of such a wheeled cart wherein the seat structure includes a seat member having a frame including opposite side rods and a seat portion extending substantially between the side rods, an upright rear gate having leg holes, means for movably supporting the seat member on the gate to extend horizontally therefrom, and a leg hole closure having side members disposed outwardly adjacent the side rods of the heat member and a closure portion extending between the side members, the closure portion including a lower rod having downturned ends secured to the side members and engageable by the side rods of the seat member frame to maintain the lower rod of the closure portion spaced from the seat portion during movement of the seat member against the closure rod ends.

Another feature of the invention is the provision of such a wheeled cart having a new and improved base frame structure having new and improved means for supporting an upper frame on a bottom frame, with said means providing effectively maximum strength and rigidity at effectively minimum cost.

A further feature of the invention is the provision of such a wheeled cart having such a base frame structure including a bottom frame having opposite side members, an upper frame having rear leg portions secured to the side members and forward portions extending from the rear leg portions and being aligned with and spaced above the side members of the bottom frame, and a C-member having an upper end aligned with and secured to the forward portion of the upper frame, a lower end aligned with and secured to the subjacent side member of the bottom frame, and a mid-portion extending between the rear of the upper end of the C-member and the rear of the lower end of the C-member.

Still another feature of the invention is the provision of a wheeled cart structure having a new and improved base frame structure including a new and improved truss means providing effectively maximum strength and rigidity at effectively minimum cost.

A yet further feature of the invention is the provision of a wheeled cart having such a base frame structure including a base member having a forward portion, and opposite side members extending rearwardly from the forward portion, each side member having a rear portion, a caster support bar extending between the side members adjacent the forward portion of the base member, and a pair of truss members each having a rear portion secured to the rear portion of a truss member, a forward portion secured to the support bar, and a mid-portion spaced above the side member.

Another feature of the invention is the provision of a wheeled cart having a base frame structure provided with new and improved reinforcing means for reinforcing the base frame, said reinforcing means providing effectively maximum strength and rigidity at effectively minimum cost.

A further feature of the invention is the provision of a wheeled cart having such a base frame structure including upstanding, spaced rear leg portions, and reinforcing means including a first rod extending between the leg portions and having end portions secured to the leg portions, and a second rod having end portions secured to the leg portions, the end portions of the reinforcing means rods being turned to extend around and conform to the external configuration of the leg portions.

A yet further feature of the invention is the provision of a wheeled cart having a frame structure provided with a new and improved means for assembling the handle wires to the frame, which means provides effectively maximum rigidity and strength at effectively minimum cost.

Yet another feature of the invention is the provision of a wheeled cart having such a frame structure including a frame having a side member, a pair of handle wires extending upwardly from the side member and having a lower end provided with an opening, and a U-clip having a bight portion overlying the side member, and leg portions extending respectively through the handle wire openings and the side member, the leg portions including distal turned ends adjacent the side member to lock the handle wires to the side member.

Still another feature of the invention is the provision of a wheeled cart having a frame structure as discussed above and further having a nameplate secured to the frame by means of the U-clip.

Other features and advantages of the invention will be apparent from the following description taken in connection with the accompanying drawing wherein:

FIGURE 1 is a side elevation of a wheeled cart provided with structure embodying the invention;

FIGURE 2 is a rear elevation thereof;

FIGURE 3 is a fragmentary vertical section taken substantially along the line 3—3 of FIGURE 1;

FIGURE 4 is a horizontal section taken substantially along the line 4—4 of FIGURE 1;

FIGURE 5 is a fragmentary horizontal section taken substantially along the line 5—5 of FIGURE 1;

FIGURE 6 is a fragmentary horizontal section taken substantially along the line 6—6 of FIGURE 1;

FIGURE 7 is a fragmentary vertical section taken substantially along the line 7—7 of FIGURE 6;

FIGURE 8 is a fragmentary vertical section taken substantially along the line 8—8 of FIGURE 7;

FIGURE 9 is a fragmentary view similar to that of FIGURE 8, except with the baby seat in a slightly elevated position as during rearward movement of the front panel toward the rear gate; and FIGURE 10 is a fragmentary vertical section taken substantially along the line 10—10 of FIGURE 6.

In the exemplary embodiment of the invention as disclosed in the drawing, a wheeled cart generally designated 10 is shown to comprise a base frame generally designated 11 carrying a basket generally designated 12 provided at the rear with a handle structure generally designated 13. The base frame is supported on a pair of rear wheels 14 and a pair of front casters 15, whereby the user may manipulate the wheeled cart by suitable urging thereof through the handle 13.

The basket 12 comprises a generally conventional basket having a rear gate 16 which, as shown in FIGURES 2 and 3, is provided with a top pivot rod 17. The basket includes a pair of upright horizontally spaced handle wires 18 and 19, as shown in FIGURE 2, which at their upper ends carry the handle 13 and which at their lower ends are secured to the base frame 11. Handle wire 18 is provided adjacent its upper end with an offset portion 20 provided with an opening 21. Wire 19 is provided adjacent its upper end with an offset portion 22 provided with an opening 23 coaxially aligned with opening 21 of wire 18. As shown in FIGURE 3, the offset portions 20 and 22 are flatted, the offset of each of the wires 18 and 19 being toward each other so that the offset portions 20 and 22 define the portions of the two wires spaced most closely to each other. As shown in FIGURE 3, the pivot rod 17 includes a first end 24 projecting through the opening 21, and a second end 25 projecting through the opening 23. The rod 17 is loosely received in the opening so as to permit free pivoting of the gate 16 therein.

The present invention comprehends an improved structure for maintaining the rod 17 against axial displacement relative to the openings 20 and 22. More specifically, herein, the rear gate 16 is provided with a cross-bar 26 having upturned ends 27 and 28 secured to the pivot rod 17 inwardly adjacent the handle wires 18 and 19. The upturned end 28 substantially slidably engages the offset portion 22 of the handle wire 19. A lock ring 29 is mounted outwardly of the handle wire in a suitable groove 30 in the end 25 of rod 17 to substantially slidably engage the outer surface of the offset portion 22 of the handle wire 19. Thus, the rod 17 is effectively precluded from moving outwardly to the left by the slidable engagement of the cross-bar end 28 with the handle wire 19 and outwardly to the right by the slidable engagement of the lock ring 29 with the handle wire 19. As shown in FIGURE 3, the right-hand end 27 of the cross-bar may be spaced somewhat from the handle wire 18 to accommodate dimensional variations in the spacing of the wires 18 and 19 from each other.

As shown in FIGURE 3, the end 25 of the pivot rod is effectively fully received within the offset space defined by offset 22 so that outer end 25 terminates substantially flush with the outer surface of the handle wire 19 above and below the offset portion 22. The end 24 of the pivot rod 17 is similarly fully received within the offset space defined by the handle wire 18 so that each of the opposite ends of the pivot rod are effectively recessed to preclude undesirable contact by the user and thereby provide improved safety in the use of the cart. The retention of the pivot rod against axial displacement is effectively positive. While the retaining means has effectively maximum strength and rigidity, the construction thereof is at effectively minimum cost.

Referring now to FIGURES 6 and 10, the basket 12 is further provided with a baby seat generally designated 31 which includes a wire frame 32 having a front rod 33, side rods 34 and 35, and a rear rod 36. The front rod 33 is pivotally connected to the front panel 37 by means of a pair of clips 38 encircling the rod 33 and a cross-rod 39 of the panel 37. The rear rod 36 includes opposite ends 40 which are slidably received in a slot 41 defined by a pair of spaced wires 42 and 43 of the rear gate 16. Thus, when the front panel 37 is moved rearwardly as shown by the clockwise arrow at the left-hand portion of FIGURE 9, the rear wire ends 40 slidably engage the rear gate wire 43 to urge the baby seat upwardly, or in a counterclockwise direction as shown by the arrow at the right-hand portion of FIGURE 9. In the final position (not shown), the front panel 37 and seat 31 are disposed in parallel juxtaposition to the rear gate 16.

The baby seat 31 further includes a seat member 44 comprising a flat plastic member having a forward edge portion 45 provided with a front depending rib 46, a middle depending rib 47, and a rear depending rib 48 defining therebetween a front channel 49 and a rear channel 50. The frame 32 further includes a seat support wire 51 which extends between the side wires 34 and 35 rearwardly of the front wire 33 and which is received in the front channel 49, as best seen in FIGURE 10. The front edge portion 45 of the seat member is secured to the wire 51 by a pair of clips 52. Each clip, as shown in FIGURE 10, includes a bight portion 53 which overlies the seat member edge portion 45. The edge portion 45 is provided with a pair of slots 54. As shown in FIGURE 10, the clip 52 further includes a front downturned leg 55 which extends around the front of the seat edge portion 45 and under channel 49 to under the middle rib 47, thereby to retain the wire 51 in the channel 49. The clip 52 further includes a rear leg 56 which extends downwardly from the bight portion 53 through the slot 54, under the rear rib 48 of the seat edge portion, 45, and thence upwardly into the rear channel 50 of the edge portion. Thus, clips 52 provide a strong, rigid retention of the front edge portion 45 of the baby seat on the frame wire 51 in a simple and economical manner.

The rear edge portion 57 of the seat member 44 is turned to be retained on the rear wire 36 of the frame 32. Thus, the seat member 44 is effectively positively retained on the frame wires 51 and 36 to be movable with the frame 32 between a seating horizontal position and a retracted upright position as discussed above.

As discussed briefly above, the basket 12 further includes a leg hole closer 58 adapted for selective positioning to effectively close the leg holes 59 defined by the rear gate 16, as shown in FIGURES 2 and 7. As shown, the leg hole closer 58 includes a pair of side members 60 and 61, a top member 62, and a bottom rod member 63 with a plurality of upright wires 64 extending between the upper member 62 and the bottom member 63 to define the means for blocking the leg holes 59, as best seen in FIGURE 7. As shown in FIGURES 2 and 7, the bottom rod 63 is provided with downturned ends 65 terminating at the side members 60 and 61. As shown in FIGURES 7 and 9, the downturned ends 65 may slidably engage the side members of the baby seat frame 32 during movement of the closer 58 relative to the baby seat 31. Thus, the plastic seat member 44 which is disposed effectively slightly above the frame 32 of the baby seat 31 is prevented from being scratched by the leg hole closer 58 and, more specifically, by the bottom rod 63 during such relative movement, as the bottom rod 63 is effectively spaced above the seat member 44 at all times during such movement. As shown in FIGURE 7, the downturned ends 65 are turned at an acute angle such as approximately 45° thereby providing an automatic self-centering action. Thus, leg hole closer 58 provides improved strength and rigidity in cart 10 at low cost, and effectively protects the plastic seat member 44 from undesirable deformation.

Referring now more specifically to FIGURE 1, the base frame 11 is shown to comprise a bottom frame 66 and an upper frame 67. The bottom frame, as shown in FIGURE 4, comprises a pair of opposite side members 68 and 69 connected at the front ends thereof by a forward bight member 70. As shown in FIGURE 4, the base frame may be formed of a continuous tubular element. The upper frame 67 includes a pair of downturned rear legs 71 and 72 secured at their lower ends to the rear of the legs 68 and 69 of the base frame 66. The upper frame further includes a bight portion 73 extending transversely under the basket 12 and connected at its opposite ends to the upper ends of the upright leg portions 71 and 72 by intermediate leg portions 74 and 75, respectively. Thus, upper frame 67 effectively defines a U-frame having the upper leg portions 74 and 75 spaced above and respectively aligned with the base frame side members 68 and 69. As shown in FIGURES 1 and 4, a C-member generally designated 76 is provided for reinforcing the forward portion of the U-frame member 67 by rigidly supporting it on the mid-portion of the side members 68 and 69 of the base frame. More specifically, the C-member 76 includes an upper leg or end 77 rigidly secured to the forward leg portion 75 (74), a lower leg portion 78 rigidly secured to the side member 69 (68) of the base frame, and a mid-portion 79 interconnecting the upper portion 77 and lower portion 78 of the C-member. As shown in FIGURE 1, the connecting portion 79 extends between the rear ends of the legs 77 and 78 so that the C-shape member in effect opens forwardly of the cart 10. As shown, the lower leg 78 of the C-member 76 is somewhat preferably longer than the upper leg 77 to provide improved rigidity at the base frame 66.

As shown in FIGURE 4, the C-member may be formed of a flat stock with the leg portions 77 and 78 and the connecting portion 79 extending coplanarly parallel to the axis of the respective side members 68 and 69 of the base frame. Thus, the C-members provide an improved strength and rigidity in the frame structure at effectively minimum cost.

Further strength in the frame structure of the cart 10 is provided herein by means of a pair of truss members 80 and 81. As best seen in FIGURE 4, the casters 15 are carried on a support bar 82 extending between the side members 68 and 69 of the base frame 66 rearwardly adjacent the forward bight portion 70 thereof. The truss members 80 comprise wire rods having a forward portion 83 downturned to butt against the caster support bar 82 and bear against the side of the side member immediately adjacent the support bar. Preferably, the downturned end portions 83 are secured to the support bar and side member as by welding 84. The truss members are further secured to the C-members 76 as by welding 85. Still further, the truss members are secured to the rear legs 71 and 72 of the U-frame member 67 at the rear ends of the truss members as by welding 86. Thus, forces acting axially of the truss members are directed therethrough against the caster support bar 82 by the butting engagement of the truss rod end 83 with the support bar, thereby providing effectively maximum strength and rigidity in the base frame at substantially minimum cost. As shown in FIGURE 4, the truss rods 80 and 81 extend substantially parallel to the side members 68 and 69 of the base frame, whereby such axial forces are directed substantially perpendicularly to the transversely extending caster support bar 82.

For further reinforcing the base frame, the cart 10 is provided with a K-bar structure generally designated 87, which as shown in FIGURE 2, extends transversely across the rear of the U-frame 67 portion of the base frame 11 somewhat above the level of the bottom frame portion 66 and substantially below the gasket 12. As illustrated in FIGURES 2 and 4, the K-bar structure 87 includes a first, lower, rectilinear rod 88 and a second, V-rod 89. The V-rod 89 is connected to the center of the lower rod 88 at the apex 90 of the V-rod, as shown in FIGURE 2. The opposite ends 91 of each of the rods 88 and 89 are arcuately turned about the upright tubular legs 71 and 72 of the U-frame 67 and are secured thereto by suitable means such as welding 92. As shown in FIGURE 4, the ends 91 extend substantially around the tubular legs 71 and 72 and in the illustrated embodiment extend approximately 90° therearound. Thus, the ends 91 conform to the external configuration of the upright legs 71 and 72 to provide an improved rigid connection between the K-bar 87 and the U-frame 67, thereby providing effectively maximum strength and rigidity in this portion of the U-frame at effectively minimum cost.

The invention further comprehends improved means for providing improved strength and rigidity in the connection of the handle wires 18 and 19 and handle wires 93 and 94 connecting the handle 13 to the U-frame 67, as shown in FIGURE 1. Referring more specifically to FIGURE 5, the forward leg portion 75 (74) of the U-frame 67 is provided with aligned openings 95 and 96. The lower ends 97 and 98 of the handle wires 19 (18) and 94 (93) are flattened and provided with openings 99 and 100, respectively. The lower ends of the handle wires are secured to the U-frame leg portion 75 (74) by means of a U-clip 101 having a bight portion 102 overlying the outer surface of the side member and having leg portions 103 and 104 extending successively through the handle wire openings 99 (100) and the U-frame member openings 95 (96). The U-clip 101 further includes distal turned ends 105 and 106 which, as shown in FIGURE 5, are inturned toward each other to extend along the inner surface of the side member 75 (74) thereby to lock the handle wires to the side member.

As illustrated in FIGURE 5, a nameplate 107 may further be secured to the side member by means of the U-clip 101. More specifically, the nameplate 107 may be provided with a pair of openings 108 and 109 corresponding to the openings 95 and 96 in the U-frame member so that the legs 103 and 104 of the U-clip 101 may be extended successively through the handle openings 97 and 98, teh nameplate openings 108 and 109, and thence through the openings in the U-frame member to assemble the nameplate with the handle wires and U-frame member. Thus, the U-clip 101 provides for improved rigidity and strength in the connection of the handle wires and nameplate to the U-frame member while at effectively minimum cost.

Wheeled cart 10, thusly, provides an improved rigid, strong construction at effectively minimum cost. The interconnection in the cart of the base frame 11, the basket 12, and the handle structure 13 provides the desirable features in a novel and simple manner. The arrangement of the baby seat and leg hole closer structures as discussed above similarly provide the highly desirable advantages in an extremely simple and novel manner.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a wheeled cart, basket structure comprising:
   a pair of upright, horizontally spaced handle wires having axially aligned openings;
   a gate for movably defining a basket wall, said gate including a pivot rod having outwardly extending opposite ends pivotally received in said aligned openings, and a cross-bar having one end secured to one of said pivot rod ends inwardly adjacent one handle wire; and
   locking means on said one pivot rod end outwardly of said one handle wire, said locking means and cross-bar end being slidably engageable with said one handle wire to retain said pivot rod against axial displacement.

2. The wheeled cart basket structure of claim 1 wherein said cross-bar includes a second end secured to said pivot rod adjacent the other end thereof and spaced from the other handle wire.

3. The wheeled cart basket structure of claim 1 wherein said locking means comprises an annular groove extending about the axis of said one pivot rod end, and an annular locking ring received in said groove and projecting outwardly therefrom to engage said handle wire.

4. In a wheeled cart, basket structure comprising:
   a pair of upright, horizontally spaced, substantially parallel, handle wires each having an enlarged, flatted portion, said flatted portions defining axially aligned openings;
   a gate for movably defining a basket wall, said gate including a pivot rod having outwardly extending opposite ends pivotally received in said aligned openings, and a cross-bar having one end secured to one of said pivot rod ends inwardly adjacent one frame element; and
   locking means on said one pivot rod end outwardly of said handle wire, said locking means and cross-bar end being slidably engageable with said one handle wire to retain said pivot rod against axial displacement, said flatted portions of the handle wires being offset toward each other to define spaces substantially aligned with the axis of the wires, the opposite ends of the pivot rod extending substantially entirely within said spaces.

5. The wheeled cart basket structure of claim 4 wherein said one pivot rod end terminates substantially flush with a line defining the outer surface of the handle wire.

6. In a wheeled cart, a seat structure comprising:
   a wire frame having a rectilinear support rod;
   a seat member including outer, middle and inner depending parallel spaced ribs defining an outer channel and an inner channel; and
   a clip having a bight portion overlying said seat member, a first portion downturned from said bight portion to extend to below said seat member and under said outer channel, and a second portion downturned from said bight portion to extend to below said seat member and around said inner rib, said support rod being received in said outer channel and retained therein by said second portion of the clip.

7. The wheeled cart seat structure of claim 6 wherein said second portion of the clip extends into said inner channel.

8. In a wheeled cart, a seat structure comprising:
   a wire frame having a rectilinear support rod;
   a seat member having a flat seating portion and a front edge portion, said front edge portion including front, middle and rear depending parallel spaced ribs defining a forward channel and a rearward channel; and
   a clip having a bight portion overlying said edge portion of the seat member, a first portion downturned from said bight portion to extend around said front edge portion under said forward channel, and a second portion downturned from said bight portion to extend through said seat member and around said rear rib, said support rod being received in said forward channel and retained therein by said second portion of the clip.

9. The wheeled cart seat structure of claim 8 wherein said seat member is provided with a slot freely receiving said second portion of the clip.

10. The wheeled cart seat structure of claim 8 wherein said first portion of the clip extends to under said middle rib.

11. In a wheeled cart, seat structure comprising:
    a seat member having a frame including opposite side rods and a seat portion extending substantially between said side rods;
    an upright rear gate having leg holes;
    means for movably supporting the seat member on said gate to extend horizontally therefrom; and
    a leg hole closer having side members disposed outwardly adjacent said side rods of the seat member and a closure portion extending between said side members, said closure portion including a lower rod having downturned ends secured to said side members and engageable by said side rods of the seat member frame to maintain said lower rod of the closure portion spaced from said seat portion during movement of the seat member against said closure rod ends.

12. The wheeled cart seat structure of claim 11 wherein said seat portion is disposed above said frame.

13. The wheeled cart seat structure of claim 11 wherein said rod ends are turned at an acute angle.

14. In a wheeled cart, seat structure comprising:
    a seat member having a frame including opposite side rods and a seat portion extending substantially between said side rods;
    an upright rear gate having leg holes;
    an upright front panel spaced forwardly of said gate;
    means for movably supporting the seat member on said gate and pivotally on said panel to extend selectively horizontally therebetween; and
    a leg hole closer having side members disposed outwardly adjacent said side rods of the seat member and a closure portion extending between said side members, said closure portion including a lower rod having downturned ends secured to said side members and engageable by said side rods of the seat member frame to maintain said lower rod of the closure portion spaced above said seat portion during movement of the seat member against said closure rod ends.

15. In a wheeled cart, frame structure comprising:
    a frame having a side member;
    a pair of handle wires extending upwardly from said side member and having a lower end provided with an opening; and
    a U-clip having a bight portion overlying said side member, and leg portions extending respectively through said handle wire openings and said side member, said leg portions including distal turned ends adjacent said side member to lock said handle wires to said side member.

16. The wheeled cart frame structure of claim 15 wherein said distal ends are inturned toward each other.

17. In a wheeled cart, frame structure comprising:
a frame having a side member;
a pair of handle wires extending upwardly from said side member and having a lower end provided with an opening;
a nameplate having spaced openings; and
a U-clip having a bight portion overlying said nameplate, and leg portions extending respectively through said nameplate openings, said handle wire openings, and said side member, said leg portions including distal turned ends adjacent said side member to lock said nameplate handle wires to said side member.

18. The wheeled cart frame structure of claim 17 wherein said bight portion is offset to engage the nameplate intermediate said openings and retain said nameplate against said side member.

References Cited

UNITED STATES PATENTS

| | | | |
|---|---|---|---|
| 1,872,539 | 8/1932 | Werdehoff | 180—69 |
| 2,639,161 | 5/1953 | Goldman | 280—33.99 |
| 2,689,133 | 9/1954 | Goldman | 280—33.99 |
| 2,898,123 | 8/1959 | Davis et al. | 280—33.99 |
| 2,914,340 | 11/1959 | Black | 280—33.99 X |
| 3,023,018 | 2/1962 | Welter | 280—33.99 |
| 2,931,622 | 4/1960 | Young | 280—33.99 |
| 3,147,021 | 9/1964 | La Chance | 280—33.99 |

BENJAMIN HERSH, *Primary Examiner.*

MILTON L. SMITH, *Examiner.*